July 5, 1960  E. PARKER  2,944,255
RADIO DIRECTION INDICATING SYSTEMS
Filed Nov. 23, 1956  4 Sheets-Sheet 1
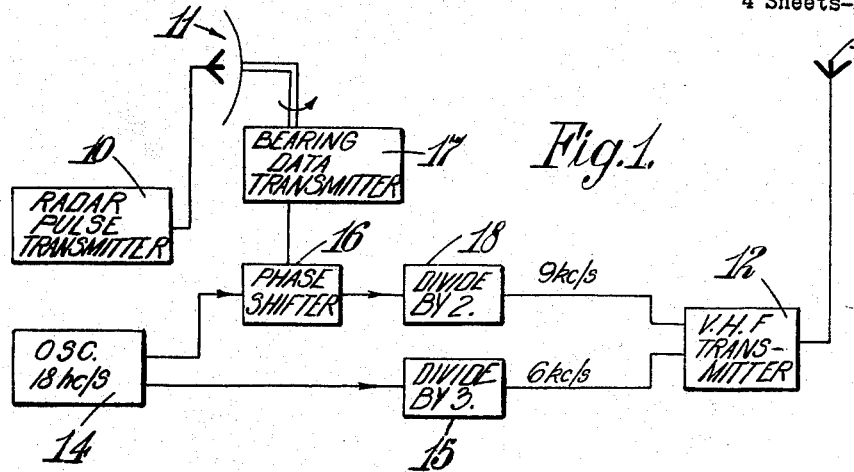
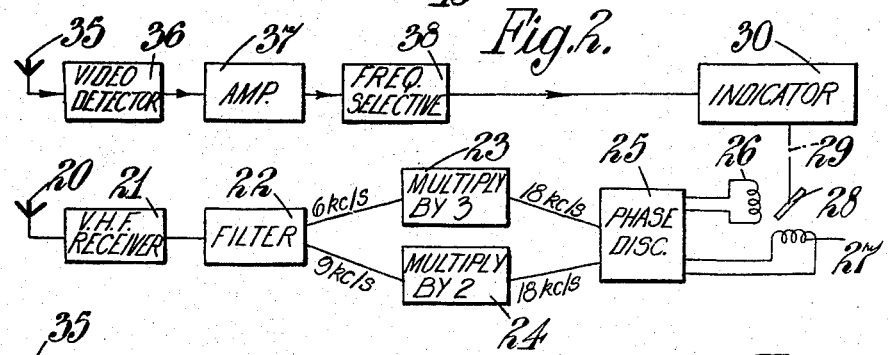
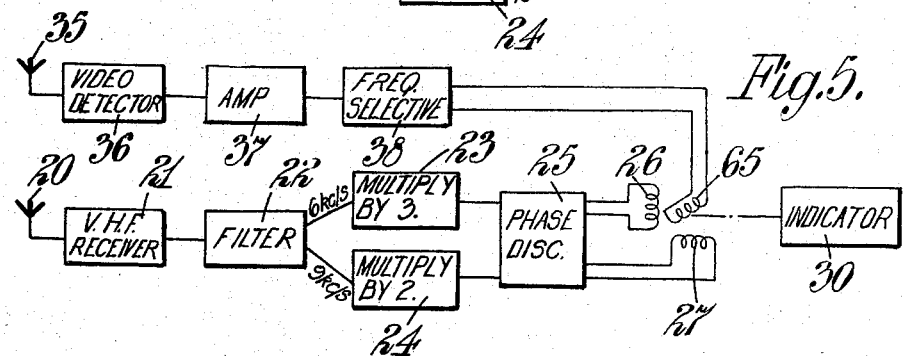
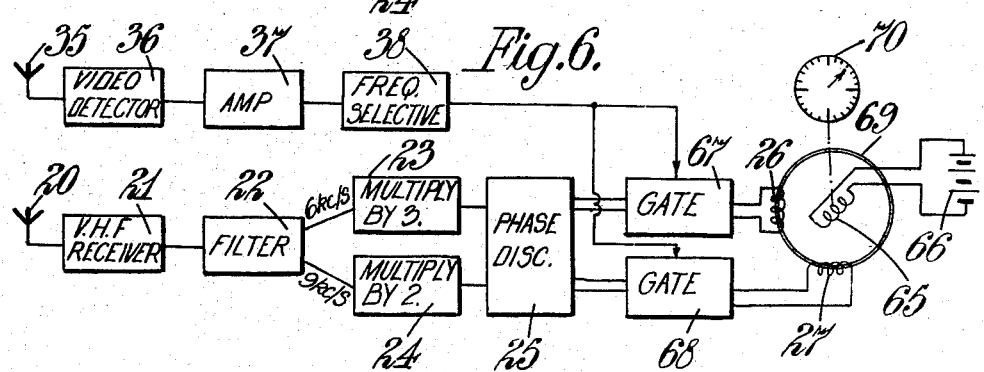

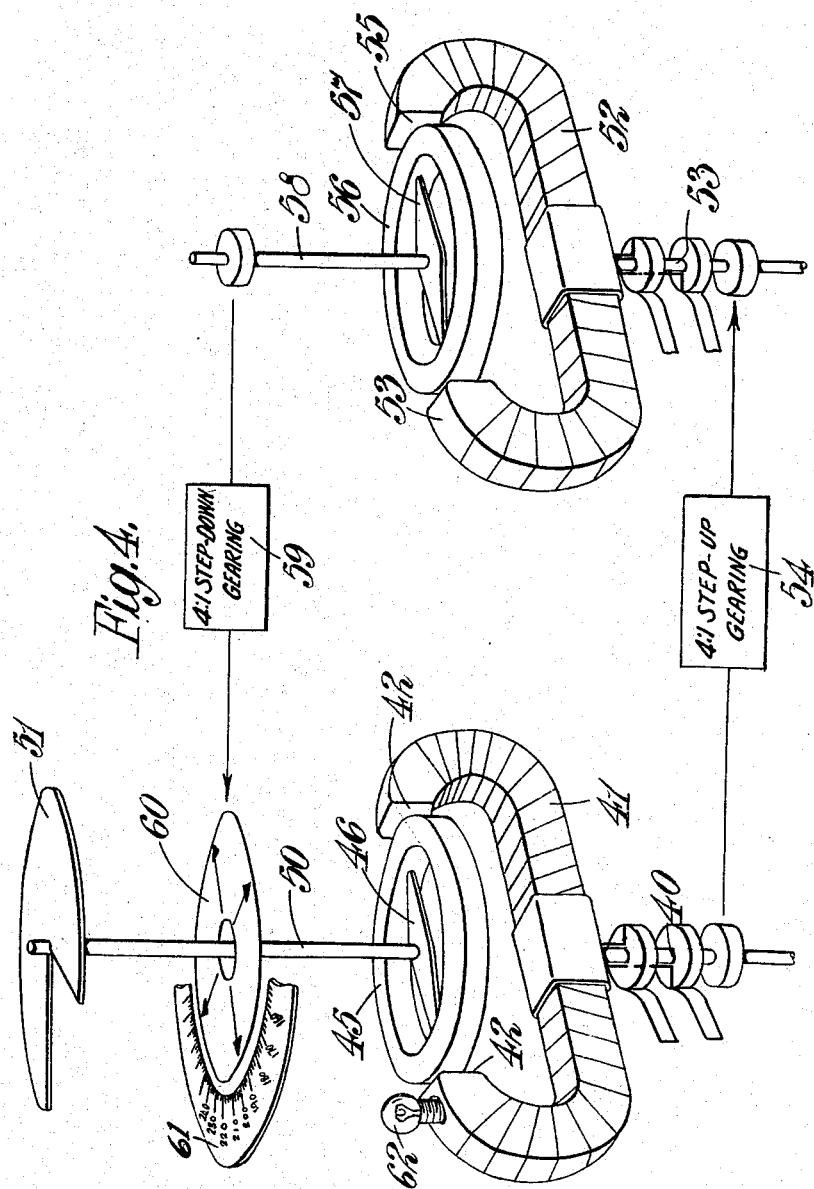

July 5, 1960  E. PARKER  2,944,255
RADIO DIRECTION INDICATING SYSTEMS
Filed Nov. 23, 1956  4 Sheets-Sheet 4
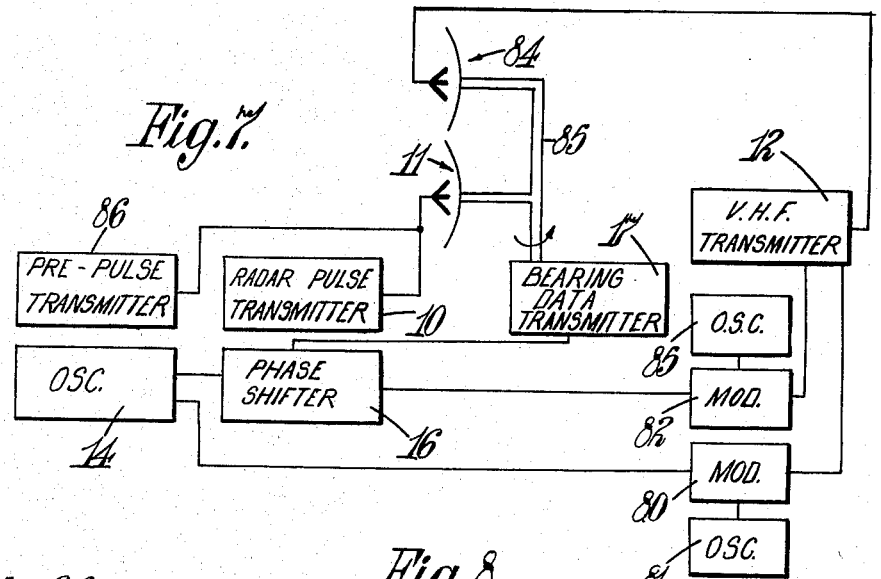
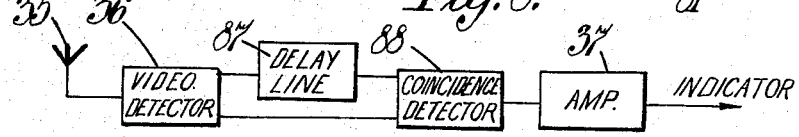
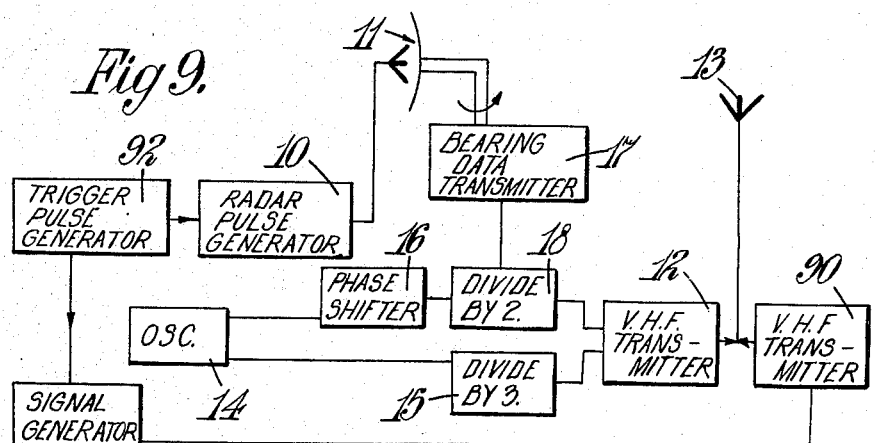
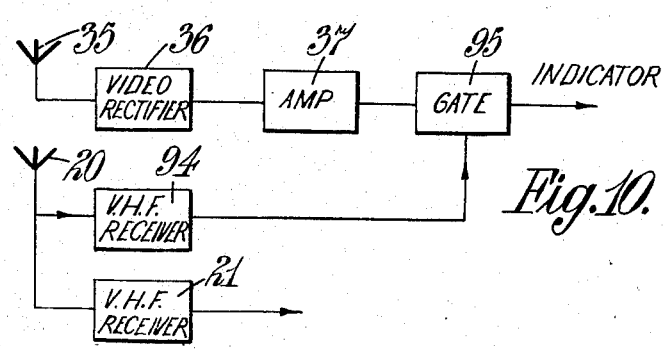

United States Patent Office 2,944,255
Patented July 5, 1960

2,944,255
RADIO DIRECTION INDICATING SYSTEMS

Eric Parker, London, England, assignor to The Decca Record Company Limited, London, England, a British company Filed Nov. 23, 1956, Ser. No. 623,958

6 Claims. (Cl. 343—106)

This invention relates to radio direction indicating systems.

Bearing indicating systems are known in which a sharply directional beam is radiated from a fixed station, the beam being rotated at a uniform speed, and in which non-directional signals are also radiated to provide, at a vehicle, a reference standard having a period related to and synchronized with the period of rotation of the beam so that, in the vehicle, the bearing of the vehicle from the fixed station can be determined from the time of reception of the directional beam in the cycle period of the non-directional signals. The non-directional signals might comprise, for example, suitably modulated continuous wave signals or short duration pulses radiated when the directional beam is in some particular direction, e.g. due north. Many other forms, however, of non-directional signal having a period related to and synchronized with the period of rotation of the directional beam may be employed.

According to this invention, in a radio direction indicating system, a sharply directional beam is radiated from a fixed station to provide, at a receiver in a vehicle, a first signal, the beam being rotated or oscillated over a sector and further signals are also radiated to provide, at the vehicle, a reference standard having a period related to or synchronized with the rotation or oscillation of the beam so that, in the vehicle, the direction of the vehicle from the fixed station can be determined from the time of reception of the directional beam in the cycle period of said further signals, and at the receiver said further signals are arranged to control the rotation or oscillation of the direction of an electro-magnetic field produced by an electro-magnetic field producing device which is energized in synchronism with the received directional signals so that the direction of the produced field depends on the direction of the vehicle from said fixed station and an indicating element for indicating the direction of the produced electro-magnetic field. With the arrangement described the signals from the directional beam will be received periodically as the beam sweeps through the direction corresponding to the direction of the vehicle from the fixed station. These received signals energize the electro-magnetic field producing device so that the field produced by that device will be in a direction dependent on the bearing of the fixed station, and this direction will be shown by the indicating element.

In one form of the invention a magnetizable element is provided which is so positioned with respect to the field of the electro-magnetic field producing device as to be magnetized thereby so that the direction or position of the magnetization of the magnetizable element depends on the direction of the vehicle from said fixed station, and, in this arrangement, the indicating element is then arranged to indicate the direction or position of magnetization of such magnetizable element. The received signals will cause the magnetizable element to be magnetized in a direction or a position dependent on the bearing of the vehicle from the fixed station. Since, in general, this bearing will only change relatively slowly, the magnetizable element will be gradually magnetized in one position or in one direction and thus forms a storage device which will ensure that the indicator continuously indicates the required bearing. Any signals received from other directional rotating or oscillating beams (e.g. similar transmitting stations) may cause momentary energization of the electro-magnetic field producing device but in general such signals would occur at random times and they would not be synchronized with the rotation of the direction of the field of the electro-magnetic field producing device and so would not build up any magnetization in the magnetizable element. By a suitable choice of material for the magnetizable element, the wanted signals can be made to build up a magnetization which would be much greater than any unwanted signals.

For providing a bearing indication over 360° of bearing angle, the directional beam would preferably be rotated continuously at a uniform speed. For some purposes however bearing indication may only be required over a limited sector and in this case the directional beam may be oscillated through the appropriate sector. The arrangement of the present invention may also be used for providing a direction indication in a vertical plane, e.g. a glide-path indication for an aircraft, by oscillating the directional beam in the vertical plane.

In the simplest form the indicating element comprises a rotatable magnet or current-carrying coil as mentioned above, and this indicating element may be connected directly to a rotatable direction indicator. The indicating element may, for example, be connected to a rotatable member carrying bearing markings which co-operate with a fixed index. Alternatively a movable index may be arranged to co-operate with a fixed scale.

In an arrangement employing a magnetizable element as described above, the magnetizable element conveniently is in the form of a disc or ring which is magnetized in a diametral direction. The electro-magnetic field producing device may comprise a rotatable or oscillatable electro-magnet energized in synchronism with the received directional signals, the rotation or oscillation of the electro-magnet being controlled by said further signals and, if the magnetizable element is a disc or ring, the electro-magnet may conveniently be in the form of a yoke with a pair of inwardly directed pole pieces directed towards the opposite edges of the disc or ring. Most conveniently a ring is employed with a magnet with the indicating element rotatably mounted inside the ring.

In another construction, the magnetizable element is in the form of an annular member and the electro-magnet is arranged to magnetize only the appropriate part of the periphery. In such an arrangement the magnetization might be in any desired direction e.g. radial, circumferential or axial.

An alternating current may be fed to the electro-magnet to destroy unwanted magnetization in the magnetizable element in the absence of received signals.

Instead of an electro-magnet, the electro-magnetic field producing device may comprise a two or three space phase (commonly called a two or three phase) winding on the stator assembly of a rotary field producing device, e.g. a synchro, which can produce a rotating magnetic field, the rotary field producing device having a permanent magnet or an electro-magnet rotor forming the indicating element. The rotor may comprise a rotatable current carrying coil and, instead of energizing the stator winding of the electro-magnetic field producing device in synchronism with the received directional signals, the rotor coil may be energized in synchronism with the received directional signals.

The aforementioned further signals may be non-directionally radiated and, in this case, these further signals need not necessarily be radiated from the fixed station but may be radiated from any convenient location. In some cases, however, it may be preferred that said further signals are directionally radiated from said fixed station in a beam in the same direction as said sharply directional beam and of angular beam-width in the direction of oscillation or rotation greater than the beam width of said sharply directional beam, the direction of radiation of said further signals being oscillated or rotated in synchronism with said sharply directional beam. Said further signals may conveniently be radiated at a radio frequency substantially lower than the radio frequency of said sharply directional beam; for example, the sharply directional beam may comprise microwave frequency signals and said further signals may be radiated as very high frequency signals. The nature of the directional signals does not affect the operation of the apparatus and very conveniently a microwave pulse transmitter may be used for producing the directional radiation as the use of microwave frequencies enables the beam to be made very sharply directional. In the microwave frequency band, almost all transmitters radiating continuous wave or pulse signals have sharply directional antennae. Any unwanted signals would only be received when the vehicle is in the beamed direction of the signals and so would only be intermittently received and would not affect the operation of the present system since such reception of the unwanted signals would not be synchronised wtih the rotation of the electro-magnet.

As stated above, the transmitter for the sharply directional beam may be a microwave pulse transmitter and use may be made of a radar transmitter for this purpose since the reception of the radar signals to determine the direction thereof will not affect the operation of the radar station in any way.

For receiving, in the vehicle, the sharply directional signals, if the latter are in a microwave band, a very simple form of broad-band receiver may be employed because of the above described freedom from interference by unwanted signals; for example, a crystal-video receiver in which the received signals are applied directly to a crystal detector to produce a rectified output which after suitable amplification may be fed directly to the electro-magnetic field producing device.

The aforesaid further signals may be radiated on any convenient frequency and, in a system for use with aircraft, these further signals may be radiated by a very high frequency (V.H.F.) transmitter such as is used for speech communication.

If said further signals are radiated by a V.H.F. transmitter, this transmitter may also be used for speech communication provided said further signals are in a form which would not interfere with the use of the transmitter for the speech communication. The further signals may, for example, be arranged to be in the band from 4 kc./s. to 10 kc./s. of the modulation bandwidth, which band is above the frequency band used for speech communication in present day aircraft communication systems.

In one arrangement the aforesaid further signals comprise two separable modulation signals having a phase relationship which is varied in synchronism with the angular rotation or oscillation of said sharply directional beam. These separable modulation signals may be sinusoidal signals of different but harmonically related frequencies which are radiated as modulations on a common carrier or they may be modulation signals of like frequency modulating sub-carriers of different frequencies on a common carrier. If the sharply directional beam is radiated by a pulse radar transmitter, the further signals may conveniently both be sinusoidal signals of the radar pulse recurrence frequency.

In one convenient form for a bearing indicating system said further signals are derived from a crystal oscillator which for the sake of example will be presumed to have the frequency of 18 kc/s. Part of the output of this oscillator is fed into a divider which divides the frequency by three producing a 6 kc./s. signal which is used to modulate the V.H.F. transmitter. Another part of the 18 kc./s. output from the oscillator is fed through the phase shifter which is rotated in synchronism with the rotation of the directional beam. The phase-shifted output is passed to a frequency divider which divides the frequency by two to produce a 9 kc./s. signal which is also used to modulate the V.H.F. transmitter. It will be seen that the multiple phase relationship between the two modulations is representative of the instantaneous position of the directional beam. At the vehicle, the V.H.F. signals are received and, after any speech signals which may be present have been separated by filter circuits, the 6 kc./s. and 9 kc./s. signals are separated and multiplied by factors of three and two respectively in separate frequency multipliers to produce two signals of frequency 18 kc./s. having a phase relationship dependent upon the instantaneous direction of the directional beam. These signals may be applied to a phase discriminator such as, for example, a phase discriminator of the kind described in W. J. O'Brien's patent specifications No. 2,562,329, dated July 31, 1951, and entitled "Double Phase Comparator Circuit" or No. 2,568,250, dated September 18, 1951, and entitled "Phase Comparator Circuit" to produce two direct current outputs for operating a cross-coil phase indicator such as, for example, is described in W. J. O'Brien's patent specification No. 2,499,326, dated February 28, 1950, and entitled "Dynamo-Electric Machine Structure." Such an indicator may be used for rotating an electro-magnet as described above or may be used directly as a two phase field producing device.

In a system in which said sharply directional beam is continuously radiated to give a bearing indication over 360° of azimuth, the aforementioned electro-magnetic field producing device, hereinafter in this paragraph referred to as the first electro-magnetic field producing device, may be arranged to produce a field rotating at the rate of rotation of said sharply directional beam and there may be provided a second electro-magnetic field producing device, for producing a field rotating at $n$ times the rate of rotation of said sharply directional beam, where $n$ is a whole number, and an indicating element associated with said second electro-magnetic field producing device, which element is coupled through an $n:1$ reduction gear to a multi-arm pointer having $n$ arms cooperating with a 360° bearing scale. The particular arm to be used in reading the scale may be selected by arranging the indicating element associated with the first electro-magnetic field producing device as a sector indicator, which will provide a less accurate but unambiguous bearing indication.

If there is a large amount of interference from received signals, further precautions can be taken to ensure that the input to the electro-magnetic field producing device is only obtained from the required fixed station. For example, the fixed station might be arranged to radiate two pulses spaced apart by, say 10 micro-seconds. At the receiver in the vehicle, a delay line and coincidence detector circuit would be provided to accept only pairs of pulses spaced apart by this particular time delay. If the ground transmitter forms part of a radar equipment, the additional pulses may be sent out before the normal radar pulse and radiated upon a slightly different frequency so as to prevent interference with the operation of the radar system. As mentioned above, the receiver on the vehicle would most conveniently be a broad-band receiver and this could be arranged to receive both the pulses and to feed them to the delay line and coincidence detector. With such an arrangement employing two radiated pulses, the spacing between the pulses from different fixed stations may be made different so that any particular station can be selected by adjustment of the delay line in the coincidence detector of the receiver.

If the directional signal is in the form of a pulse transmission, another method of avoiding interference from other signals is by transmitting an auxiliary signal on quite a different frequency from that employed for the directional beam. For example, if the directional beam is on a microwave frequency, the auxiliary signal may be in the V.H.F. band and the auxiliary signal modulated so that auxiliary pulses timed to coincide with the directional pulses may be derived at the vehicle, which auxiliary pulses are arranged, at the vehicle, to control a gating circuit in the receiver for the directionally beamed signals so that only pulses received at the time of the required directional beam pulses would be fed to the electro-magnetic field producing device. The auxiliary signals may be transmitted on an auxiliary directional beam rotating in synchronism with the principal directional beam or they may be transmitted non-directionally. They may conveniently be part of or associated with or derived from said further signals which are radiated to provide the reference standard at the vehicle, for example, the auxiliary signals may be a sinusoidal signal at the pulse recurrence frequency, which signal may be used also as one of the aforementioned separable modulation signals.

Another method of reducing interference in the reception of the directional beam, if this beam is in the form of pulse signals, would be by having circuit means in the receiver selecting only pulses having a predetermined repetition frequency. Different repetition frequencies may then be used to differentiate between different fixed stations.

The following is a description of a number of embodiments of the invention, reference being made to the accompanying drawings in which:

Figure 1 is a block diagram of transmitting equipment at a ground station for a radio direction indicating system;

Figure 2 is a block diagram of the equipment for use on a vehicle in conjunction with the transmitting equipment of Figure 1;

Figure 4 is a diagrammatic perspective view of another form of indicator for the arrangement of Figure 2;

Figure 5 is a diagram illustrating a modified form of the receiving equipment of Figure 2;

Figure 6 is a diagram illustrating another modified form of the receiving equipment of Figure 2;

Figure 7 is a block diagram of a modified form of the transmitting equipment of Figure 1;

Figure 8 is a block diagram illustrating part of the receiving equipment for use with the transmitting equipment of Figure 7;

Figure 9 is a block diagram illustrating yet another form of transmitting equipment; and Figure 10 is a block diagram illustrating part of the receiving equipment for use with the transmitting equipment of Figure 9.

Figure 3:
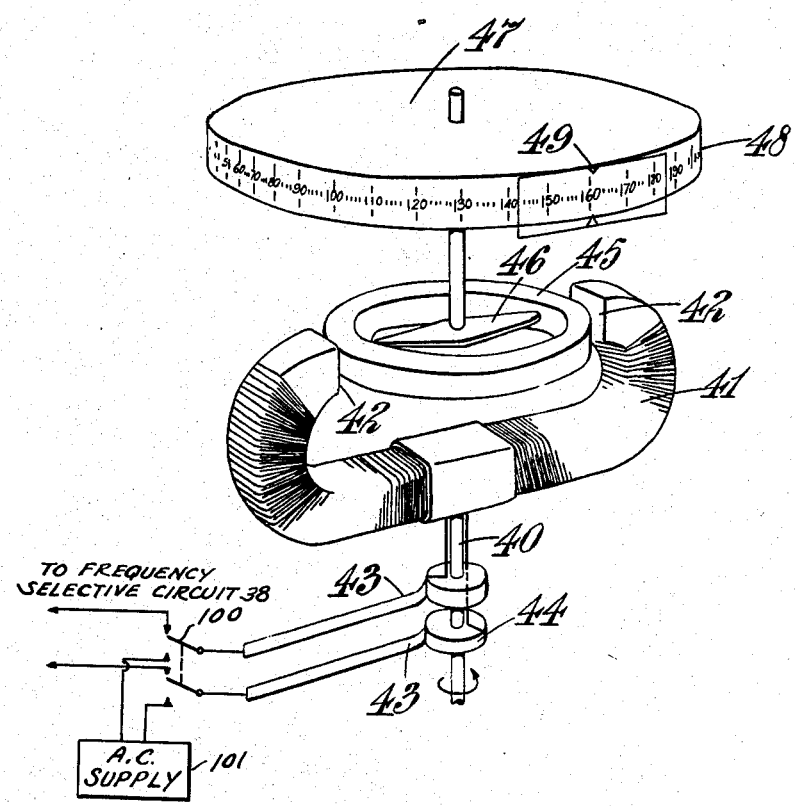
Figure 3 is a diagrammatic perspective view of an indicator for the arrangement of Figure 2.

Referring to Figure 1, there is shown diagrammatically a radar pulse transmitter 10 producing microwave pulse-modulated signals which are fed to a transmitting aerial 11 providing a sharply directional beam which is either continuously rotated through 360° of azimuth or is oscillated through a sector. There is also provided a very high frequency (V.H.F.) transmitter 12 coupled to a transmitting aerial 13 which is conveniently a non-directional aerial. This V.H.F. transmitter 12 may form part of a communication system between the radar station and a vehicle such as an aircraft. The V.H.F. transmitter 12 is modulated with signals derived from an oscillator 14 which gives, for example, an output of a frequency of 18 kc./s. Part of the output of the oscillator 14 is fed to a frequency divider 15 which divides the frequency by three to produce a 6 kc./s. signal for modulating the V.H.F. transmitter 12. Another part of the output of the oscillator 14 is fed through a phase shifter 16 which may conveniently be a goniometer. This phase shifter 16 is oscillated or rotated in synchronism with the oscillation or rotation of the aerial 11, the phase shifter 16 being controlled for this purpose by a bearing data transmitter 17. The phase shifter and its control system are so arranged that the angular shift in phase introduced by the phase shifter corresponds in magnitude to and is synchronised with the angular movement of the aerial 11. The output of the phase shifter 16 is fed to a second frequency divider 18 which divides the frequency by two to produce a 9 kc./s. signal which is also applied as a modulation to the V.H.F. transmitter 12.

The receiving equipment for use with the transmitting arrangement of Figure 1 is illustrated in Figure 2 and includes a V.H.F. receiving aerial 20 coupled to a V.H.F. receiver 21, which receives the signals radiated from the antenna 13. The aerial 20 and receiver 21 may form part of the aforementioned communication equipment providing communication between the radar station and the vehicle. The output from the receiver 21 is passed into a filter circuit 22 which separates the 6 and 9 kc./s. signals and feeds the first of these into a multiplier 23 and the second into a multiplier 24. The multiplier 23 multiplies the frequency of its input by a factor of 3 whilst the multiplier 24 multiplies by a factor of 2 so that outputs of both multipliers are of 18 kc./s. These outputs are applied to the two input circuits of a phase discriminator 25 which provides two direct current outputs proportional respectively to the sine and cosine of the phase angle between the two inputs. This phase discriminator may conveniently be of the form described and claimed in the aforementioned patent specifications No. 2,562,329 or No. 2,568,250. The two outputs from the phase discriminator 25 are applied respectively to coils 26, 27 of a crossed coil instrument having coils or sets of coils at right angles forming a stator assembly and having a permanent magnet rotor 28. If a sine signal is applied to one coil or of one set of coils of such an assembly and a cosine signal to the other coil or set of coils, the rotor will take up an angular position corresponding to the phase difference between the two inputs to the phase discriminator 25. The rotor is arranged to drive, as indicated diagrammatically by the chain dotted line 29, an indicator 30 to be described in further detail later. One form of construction for such a crossed coil device having a permanent magnet rotor is described and claimed in the aforementioned patent specification No. 2,499,326.

The receiving equipment of the vehicle also includes a microwave receiving aerial 35 coupled to a microwave receiver 36. This receiver is preferably a broad-band receiver and may conveniently be a crystal-video receiver in which the received signals are applied directly to a crystal detector to produce a rectified output, which is then fed to an amplifier 37 for amplification before being applied to the indicator 30.

There is also shown in Figure 2 a frequency selective circuit 38 between the amplifier 37 and the indicator 30. The radar signals transmitted from the aerial 11 and received by the aerial 35 are in the form of pulse-modulated radio frequency signals and, in accordance with normal radar practice, may have a constant pulse repetition frequency. If the repetition frequency is constant, a frequency selective circuit 38 may be provided to select only pulse signals having this recurrence frequency, so providing a large measure of discrimination against unwanted pulse signals received at the aerial 35 and detected by the broad-band receiver 36. If the different radar stations are arranged to have different repetition frequencies, the frequency selective circuit 38 may be made switchable so that it could be switched to select only pulses from a particular radar station.

The indicator 30 is illustrated in further detail in Figure 3, and, referring to this figure, there is shown a shaft 40 which is driven from the aforementioned rotor 28 and which carries a yoke-shaped electro-magnet 41 having a pair of inwardly directed poles 42. The electro-magnet winding is energized from the aforementioned frequency selective circuit 38 through a pair of brushes 43 and co-operating slip rings 44 so that the electro-magnet is energized whenever an output is obtained from the receiver 36. The poles 42 of the magnet 41 rotate around a magnetizable storage ring 45 within which is rotatably mounted a permanent magnet 46 carrying an indicator 47 with a peripheral bearing scale 48 which co-operates with a fixed index mark 49.

The operation of the system of Figures 1 to 3 is as follows:

At the ground station the radar pulses are transmitted in a directional beam which is rotated or oscillated and the V.H.F. transmitter radiates signals having two sinusoidal modulations of different frequency the phase relationship of which is a measure of the angular position of the radar aerial. In the vehicle the V.H.F. receiver 21 picks up and detects the signals representative of the angular position of the antenna and feeds them to the phase discriminator 25 to provide outputs which control the position of the rotor 28 so that the latter rotates or oscillates in synchronism with the rotation or oscillation of the ground radar aerial. The rotor 28 drives the electro-magnet 41 so that the latter is rotated or oscillated about the axis of the ring 45. The electro-magnet is only energized when the microwave receiver 36 receives signals, that is to say only when the directional beam from the radar transmitter is pointed towards the vehicle. When the electro-magnet is energized, it will tend to magnetize the ring 45 in a direction dependent on the position of the electro-magnet and hence in a position dependent on the bearing of the vehicle from the ground station. Since in general this bearing will only change relatively slowly, the ring 45 will gradually be magnetized in one diametral direction and will thus form a storage device which ensures that the permanent magnet 46 continually maintains a position corresponding to the bearing of the vehicle from the ground station. Any signals received from other sources may cause momentary magnetization of the electro-magnet but, in general, such signals will occur at random times and would not be synchronised with the rotation or oscillation of the electro magnet and hence would not build up any permanent magnetization in the ring 45. The ring 45 is made of a suitable magnetic material such that the wanted signals can be made to build up a magnetization which will be much greater than any unwanted signals. The position of the permanent magnet is indicated by the position of the bearing scale 48 with respect to the index 49, but it will be appreciated that the magnet 46 might alternatively be arranged to carry a pointer which traverses over a fixed scale.

In the indicator of Figure 3, provision may be made for feeding an alternating current to the electro-magnets in the absence of any received microwave signals so as to destroy any remanent magnetization of the storage rings. For this purpose there is shown in Figure 3 a double pole switch 100 for connecting the electro-magnet 41 to an alternating current supply 101.

Figure 4 shows an alternative construction of indicator for use in the receiving arrangement of Figure 2 and which provides a more accurate bearing indication. For convenience, where applicable the same reference characters will be used in Figure 4 as in Figure 3 to denote corresponding components. As in the arrangement of Figure 3 there is provided in Figure 4 a shaft 40 which is driven by the aforementioned rotor 28 and which carries an electromagnet 41 having inwardly directed poles 42 directed towards a magnetizable ring 45. Rotatably mounted axially within this ring is a permanent magnet 46 on a shaft 50 which carries a masking disc 51 having a cut-away sector. In addition there is provided a second electro-magnet 52 mounted on a shaft 53 which is driven from the shaft 40 by a step-up gearing 54 having, in the particular embodiment illustrated, a ratio of 4:1. The electro-magnet 52 is thus rotated or oscillated at four times the rate of rotation or oscillation of the electro-magnet 41. The electro-magnet 52 is generally similar in construction to the electro-magnet 41 and has inwardly directed poles 55 directed towards a magnetizable storage ring 56 within which there is rotatably mounted a permanent magnet 57 on a shaft 58. The electro-magnet 41 is energized from the microwave receiver 36 as in the arrangement of Figure 3 and the same energizing signals are also applied to the electro-magnet 52. The shaft 58 is coupled through a step-down gearing 59 having the same ratio as the step-up gearing 54, i.e. in the particular embodiment shown a 4:1 step-down ratio, which gearing 59 drives a four-armed pointer 60. More generally, the pointer has the same number of arms as the step-up and step-down ratio of the gearing. This pointer, which is mounted co-axially with the masking disc 51, conveniently comprises a disc with the four pointer arms engraved or marked thereon and surrounding this disc is a fixed bearing scale 61. Considering for simplicity an arrangement in which the radar transmitting aerial 11 is continuously rotated, the electro-magnets 41 and 52 will also be continuously rotated, but the electro-magnet 52 will make four complete revolutions for each revolution of the radar aerial, and the ring 56 will only be magnetized once each four revolutions of the magnet 52. It will be appreciated, however, that the instrumental errors in detecting the direction of magnetization of the ring 56 are much less than those in detecting the position in the magnetization in the ring 45, and hence the pointer arms 60 will provide a more accurate indication of the bearing although this indications will be ambiguous because there are four pointer arms. The masking disc 51, however, enables only the appropriate pointer arm to be seen and hence enables the bearing to be read unambiguously but with the accuracy arising from the use of the electro-magnet 52 rotating at four times the speed of the radar aerial.

Instead of driving the shaft 53 from the shaft 40 through step-up gearing, it might be separately driven by further signals radiated from the ground station, for example, over the V.H.F. link.

There is also shown in Figure 4 a lamp 62 which is energized in synchronism with the electro-magnet 41, the lamps being connected in series or in parallel with the electro-magnet. The lamp will flash as the electro-magnet rotates and it will be immediately apparent whether the indicator pointer is pointing towards the regular flashing which would be associated with the wanted signals. In an arrangement such as is shown in Figure 4 having a movable index cooperating with a fixed scale, the lamp may be arranged to illuminate the index so that the index would be brightened at regular intervals so long as the apparatus was operating correctly.

Figure 5 illustrates a modification of the arrangement of Figure 2. Similar reference characters are used to indicate similar components and, in the following, mention will only be made of the distinctions between the two arrangements. The two outputs from the phase-discriminator 25 are fed to fixed coils 26, 27 but, instead of having a permanent magnet rotor 28, there is provided a rotatable coil 65 which is energized with the output from the amplifier 37 which amplifies the detected microwave signals. It will be seen that the coils 26, 27 will produce a rotating field and, when the coil 60 is energized, it will align itself with the instantaneous position of this field. This rotor 65 will thus take up a position representative of the bearing of the vehicle from the radar station and, since this bearing will not in general change quickly, the rotor 65 will always remain in a position representative of the bearing. This rotor may be used for directly driving a pointer which cooperates with a fixed bearing scale. The rotary field producing device comprising the coils 26, 27 and the associated rotor may be constructed in a manner similar to a synchro.

As shown in Figure 6, which illustrate another modification of the arrangement of Figure 2, instead of applying the signals from the microwave receiver 36 to a rotatable coil of the assembly, this rotatable coil 65 may be continuously energized as is indicated diagrammatically from a battery 66, and the output from the microwave receiver applied to gating circuits 67, 68 controlling the application of the sine and cosine signals from the phase discriminator 25 to the windings 26, 27 so that a magnetic field is produced only in the direction corresponding to the bearing of the vehicle from the ground station. In this latter case the windings 26, 27 are preferably wound on a magnetic core 69 which will form a magnetizable element so that the rotor 65 will tend always to remain in a position corresponding to the bearing of the vehicle. If such a core 69 is provided, the rotor 65 most conveniently is used to drive directly a bearing indicator pointer, indicated diagrammatically at 70, since the magnetizable core now fulfils the functions of the magnetizable ring 45 in the indicators of Figures 3 and 4.

Instead of using a continuously energized coil 65, there may alternatively be employed a permanent magnet rotor in the arrangement of Figure 6. The equipment of Figure 6 may be duplicated in the vehicle with the magnetic field of the second set of equipment arranged to rotate at an integral multiple of the speed of rotation of the directional beam, e.g. four times as fast so thereby providing coarse and fine bearing indications equivalent to those provided by the arrangement of Figure 4.

In Figure 7 there is illustrated a modification of the transmitting equipment of Figure 1 and similar reference characters are used in Figure 7 as in Figure 1 to indicate similar components. In Figure 7 there is provided a microwave radar pulse transmitter 10 feeding a directional transmitting aerial 11 which is rotatably mounted for scanning either through 360° as azimuth or over a limited sector. There is also provided a V.H.F. transmitter 12 which is modulated by two sub-carriers carrying signals derived from an oscillator 14 in the following manner. Part of the output of the oscillator 14 is fed to a modulator 80 for modualting a first sub-carrier derived from an oscillator 81 and the modulated sub-carrier is then applied as a modulation to the transmitter 12. A second part of the output from the oscillator 14 is fed through a phase shifter 16 which is controlled by a bearing data transmitter 17 so that the angular phase shift corresponds to the angular movement of the radar aerial 11. The output from the phase shifter 16 is fed to a second modulator 82 to modulate a second sub-carrier derived from an oscillator 83 having a frequency different from that of the oscillator 81 and this modulated sub-carrier is then applied as a second modulation to the V.H.F. transmitter 12.

The output from the V.H.F. transmitter 12 might be radiated on a non-directional aerial such as the aerial 13 of Figure 1. As is illustrated diagrammatically in Figure 7, however, the output of the V.H.F. transmitter may be fed to a directional aerial 84, provided this aerial has an angular beam width in the plane of rotation or oscillation greater than that of the radar aerial 11 and provided the two aerials are aligned and rotated or oscillated together. It will be seen that if directional aerials of the same dimensions are used for both the microwave radar pulses and the V.H.F. transmissions, then the beam width of the V.H.F. beam will be much greater than that of the radar beam and thus it is readily possible to meet the requirements as to the relative beam width of the two beams and the two aerials 11 and 84 may conveniently be carried on a common rotatable mount 85. The use of a directional beam for the V.H.F. transmissions will not affect the operation of the receiving equipment since, although the reference standard signals providing indication of the direction of the radar beam are only intermittently available at the receiver these signals will define a direction of a magnetic field in the coils 26, 27 and hence will align the associated rotor.

In Figure 7 there is also illustrated a further modification of the transmitting equipment for reducing any possibility of interference in the reception of the radar pulse signals. For this purpose, there is provided a pre-pulse transmitter 86 which is arranged to radiate pulses at a short time, for example 10 micro-seconds before the radar pulse. These pre-pulses are radiated on a slightly different frequency from the normal radar pulses in order to prevent interference with the operation of the radar equipment and may be radiated from a directional or nondirectional aerial. Most conveniently the pre-pulses are radiated by the radar aerial 11. The receiving equipment for use with this arrangement employing a pre-pulse is modified in the manner illustrated in Figure 8. As shown in that figure, the aerial 35 is coupled to a video detector 36 as in the previously described arrangements, the video detector circuit being a broad band circuit for receiving and detecting both the radar pulses and the pre-pulses. Part of the output of the video detector is fed into a delay line 87 having a delay period equal to the time difference between radiation of the pre-pulse and the next radar pulse from the ground station and the output from the delay line 87 is fed into a coincidence detector 88 into which is also fed directly part of the signals of the video detector 36. This coincidence detector circuit is arranged to accept only pairs of pulses having a time interval equal to that of the delay line 87 and thus only such pairs of pulses will provide an output to be fed to the amplifier 37. The remainder of the receiving equipment may be similar to any of the previously described embodiments.

Figure 9 shows yet another modification of the arrangement of Figure 1 for preventing interference with the receiver signals from the radar transmitter. The arrangement of Figure 9 is similar to that of Figure 1 except that there is provided a second V.H.F. transmitter 90 which is modulated with auxiliary signals synchronized with the radar pulses, these auxiliary signals being derived from a signal generator 91 controlled by a trigger pulse generator 92 which trigger pulse generator also controls the radar pulse transmitter 10. The auxiliary signals may be pulses timed to coincide with the radar pulses or in a predetermined time relationship therewith or they may be sinusoidal signals from which a timed pulse may be derived at the receiver. The transmitter 90 may conveniently be coupled to the same aerial 13 as the transmitter 12. In the vehicle, the receiving equipment, part of which is shown in Figure 10, is provided with a further V.H.F. receiver 94 which receives the auxiliary signals, conveniently employing the aerial 20 for this purpose, and derives therefrom pulses synchronised with the radar pulses. These pulses are applied as control signals to to a gating circuit 95 for gating the output of the amplifier 37. The remainder of the receiving equipment may be similar to any of the previously described embodiments.

In Figure 9, a separate signal generator 91 is shown for providing the auxiliary signals. However, it is not necessary to have a separate signal generator as the oscillator 14 may be used for this purpose and the transmissions from the V.H.F. transmitter 12, which are received by the receiver 21 used for controlling the gate 96 of Figure 10. Preferably in this case, to avoid the low frequencies of the auxiliary signals which would be produced by the dividers 15, 18, the phase transmission system of Figure 7 is employed.

In any of the arrangements described in which the indicating element is a current carrying coil, the electromagnetic field producing device for producing the field controlling the element may be energized with short bursts of alternating current provided the indicating element is also energized with alternating current of the same frequency and phase.

I claim:

1. A radio direction indicating system comprising a fixed station having first transmitting means arranged to radiate a first signal in a sharply directional beam which is continuously rotated and second transmitting means arranged to radiate further signals providing a reference standard having a cyclic period synchronised with the rotation of said beam, and a receiver comprising means for receiving said directionally-beamed signals and said further signals, an electromagnetic field producing device, means coupling said field producing device to said receiving means for energizing said field producing device in synchronism with the received directionally-beamed signals, drive means arranged to rotate said field producing device in synchronism with the received further signals, a magnetizable element positioned with respect to the field of said field producing device so as to be magnetized by the field produced by said device and an indicating element controlled by said magnetizable element so as to take up a position dependent on the position of said field producing device when it is magnetized by the field produced by the received directionally-beamed signals.

2. A radio direction indicating system as claimed in claim 1 wherein said field producing device comprises a rotatable electro-magnet.

3. A radio direction indicating system as claimed in claim 2 wherein means are provided for feeding an alternating current to said electro-magnet to destroy unwanted magnetization in the magnetizable element in the absence of received signals.

4. A radio direction indicating system as claimed in claim 1 wherein said magnetizable element comprises a ring which is magnetized in a diametral direction.

5. A radio direction indicating system as claimed in claim 4 wherein said field producing device comprises an electro-magnet in the form of a yoke with a pair of inwardly directed pole pieces directed towards diametrically opposite points on said ring.

6. A radio direction indicating system as claimed in claim 5 wherein a lamp is mounted on one end of said electro-magnet with means for energizing the lamp when the electro-magnet is energized.

References Cited in the file of this patent

UNITED STATES PATENTS

| | | |
|---|---|---|
| 2,070,651 | Dowsett et al. | Feb. 16, 1937 |
| 2,444,439 | Grieg et al. | July 6, 1943 |
| 2,531,918 | O'Brien | Nov. 28, 1950 |